(No Model.)
A. A. FOOS.
COFFEE POT.
No. 305,168. Patented Sept. 16, 1884.
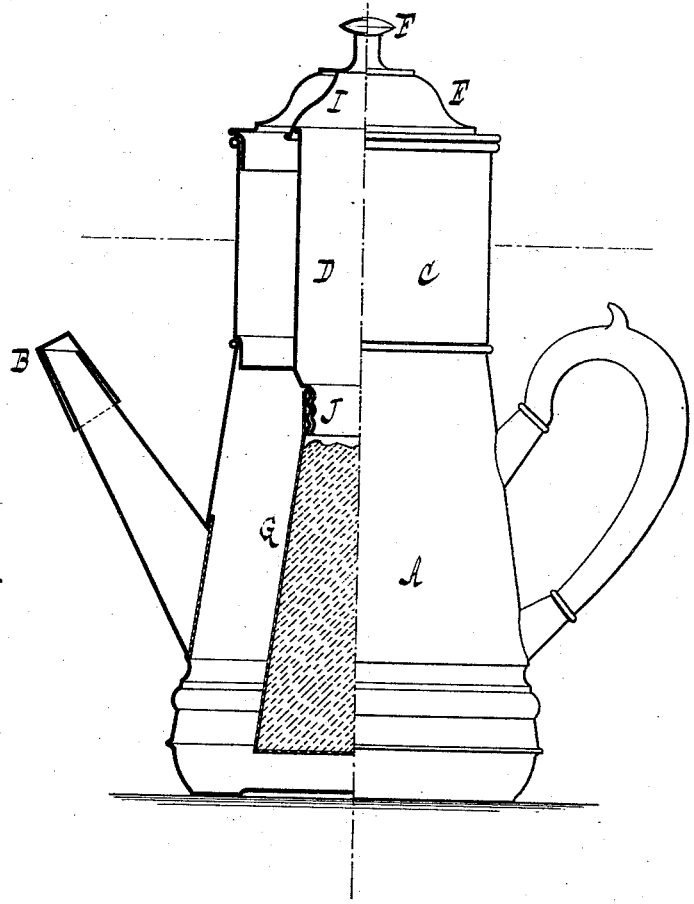
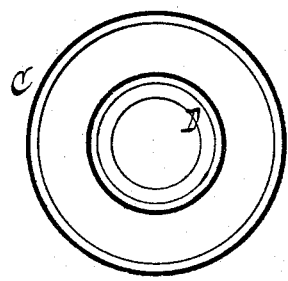
WITNESSES:
INVENTOR:
Albert A. Foos
BY Van Santvoord & Hauy
his ATTORNEYS

UNITED STATES PATENT OFFICE.

ALBERT A. FOOS, OF BROOKLYN, NEW YORK.

COFFEE-POT.

SPECIFICATION forming part of Letters Patent No. 305,168, dated September 16, 1884.

Application filed August 8, 1883. (No model.)

*To all whom it may concern:*

Be it known that I, ALBERT A. FOOS, a citizen of the United States, residing at Brooklyn, in the county of Kings and State of New York, have invented new and useful Improvements in Coffee-Pots, of which the following is a specification.

This invention has for its object to provide a coffee or tea pot with novel and efficient means for condensing the steam formed by the boiling of the water to produce the decoction, preserving the aroma of the coffee or tea, and sounding an alarm to indicate when steam is generated.

To such end the invention consists in the construction and combination of devices hereinafter described and claimed, reference being had to the accompanying drawings, in which—

Figure 1 shows one half of the pot in side view and the other half in vertical section. Fig. 2 is a horizontal section of the condensing-vessel.

Similar letters indicate similar parts.

The letter A designates the body of the pot, which may be of any ordinary form, its spout, however, being preferably furnished with a cap, B; and C indicates the condensing-vessel, which consists of a cylindrical or similar shaped vessel having a removable but tightly-fitting cover, E, provided with a central steam-whistle, F, of any usual or suitable construction. A vertical steam-passage is arranged centrally within the condensing-vessel, and consists of a cylinder or tube, D, connected adjacent to its lower end with the lower end of the condensing-vessel, the upper and lower ends of the cylinder or tube being open for the free upward passage of steam therethrough. The lower end of the condensing-vessel rests upon the upper end or mouth of the coffee-pot, and said vessel is supplied with cold water; but in order that the ebullition of the water put into the coffee-pot for making the decoction may not be retarded thereby, the cold water should not be poured into the vessel until steam has been generated, which fact is indicated by the whistle F, the steam rising in the passage D to act on the whistle.

In order to increase the effect of the steam on the whistle, the lid E is provided with a pendent annular flange, I, which rests upon the upper surrounding edge of the cylinder or tube D, and serves to direct the full head of steam to the whistle.

I am aware that the lid of a coffee-pot has been provided with a whistle connected by a tube with the interior of the pot to sound an alarm when steam is generated, and I am also aware that a coffee-pot has been provided with a condenser at its top; but such features are not broadly claimed by me.

The condensing-surface of the vessel C is increased in area by the steam-passage D, and it will be seen that when the steam comes in contact with such surface it is at once condensed, while the water of condensation drips back into the pot.

The percolator G serves to receive the coffee from which the decoction is to be made, and is attached to the lower end of the steam-passage D by a screw-thread, J, or other proper means, to render it removable.

What I claim as new, and desire to secure by Letters Patent, is—

1. The combination, with a coffee-pot, of a condenser composed of a vessel supported by the pot, and having at its upper end a lid provided with a steam-whistle, said vessel containing centrally within it a vertical cylinder or tube, open at each end and connected at its lower portion with the lower portion of the vessel, and the upper open end terminating below the lid having the steam-whistle, substantially as described.

2. The combination, with a coffee-pot, of a condenser composed of a vessel having a centrally-arranged cylinder or tube, open at each end and connected with the lower portion of the vessel, a lid closing the upper end of said condensing-vessel, and having a steam-whistle arranged above the open end of the cylinder or tube, and a coffee-percolator suspended from the lower end of the cylinder or tube beneath the condensing-vessel, substantially as described.

3. The combination of a coffee-pot, a condensing-vessel supported thereon and containing a centrally-arranged cylinder or tube connected with the lower portion of the vessel and open at each end, and a lid closing the upper end of the vessel, and having a steam-whistle and a pendent flange surrounding and bearing on the upper edge of the cylinder or tube, substantially as described.

In testimony whereof I have hereunto set my hand and seal in the presence of two subscribing witnesses.

ALBERT A. FOOS. [L. S.]

Witnesses:
  CHAS. WAHLERS,
  E. F. KASTENHUBER.